United States Patent [19]

Peppel et al.

[11] Patent Number: 4,706,998

[45] Date of Patent: Nov. 17, 1987

[54] AXIAL DISPLACEMENT COUPLING

[75] Inventors: George W. Peppel, Arlington; Paul E. Sullivan, Bedford, both of Tex.

[73] Assignee: Lockheed Corporation, Calabasas, Calif.

[21] Appl. No.: 904,867

[22] Filed: Sep. 8, 1986

Related U.S. Application Data

[63] Continuation of Ser. No. 678,348, Dec. 5, 1984, abandoned.

[51] Int. Cl.$^4$ ............................................. F16L 27/06
[52] U.S. Cl. .................................. 285/167; 285/223; 285/233; 285/263; 285/302
[58] Field of Search ................. 285/51, 165, 166, 167, 285/223, 231, 234, 233, 263, 302, 369, 281

[56] References Cited

U.S. PATENT DOCUMENTS

| | | | |
|---|---|---|---|
| 908,414 | 12/1908 | Mellin | 285/136 |
| 2,845,283 | 7/1958 | Kuhn | 285/166 |
| 3,038,743 | 6/1962 | Zaloomis | 285/231 |
| 3,190,374 | 6/1965 | Caperan et al. | 285/55 |
| 3,194,589 | 7/1965 | Kahlbau et al. | 285/49 |
| 3,235,293 | 2/1966 | Condon | 285/233 |
| 3,680,895 | 8/1972 | Herbert et al. | 285/261 |
| 3,734,546 | 5/1973 | Herbert et al. | 285/234 |
| 3,853,337 | 12/1974 | Herbert et al. | 285/49 |
| 3,938,833 | 2/1976 | Miyaoka | 285/166 |
| 3,957,291 | 5/1976 | Edling et al. | 285/261 |
| 4,068,868 | 1/1978 | Ohrt | 285/263 |
| 4,076,284 | 2/1978 | Herbert et al. | 285/223 |
| 4,098,527 | 7/1978 | Herbert et al. | 285/234 |
| 4,103,939 | 8/1978 | Herbert et al. | 285/137 A |
| 4,135,741 | 1/1979 | Albertsen | 285/233 |
| 4,173,360 | 11/1979 | Bergman et al. | 285/223 |
| 4,183,556 | 1/1980 | Schwemmer | 285/263 |
| 4,198,078 | 4/1980 | Herbert et al. | 285/47 |
| 4,491,348 | 1/1985 | Thelen | 285/234 |
| 4,515,399 | 5/1985 | Sullivan et al. | 285/95 |
| 4,593,941 | 6/1986 | Whigntsil | 285/167 |

FOREIGN PATENT DOCUMENTS 2121905  1/1984  United Kingdom ............... 285/223

Primary Examiner—Cornelius J. Husar
Assistant Examiner—Eric K. Nicholson
Attorney, Agent, or Firm—Eric R. Katz

[57] ABSTRACT

A flexible connector for effecting fluid-tight flexible joints between fluid conduits which comprises a housing with a central bore, a pair of movable flanges extending one from each end of the central bore and means interposed between the flanges and the inner surfaces of the central bore so that a fluid tight seal is achieved therebetween and the flanges can undergo angular motion; additional means are also interposed between the flanges and the inner surfaces of the central bore which accommodates linear motion of the flanges along the axis of the housing while maintaining a fluid-tight seal therebetween; and means for holding the elements of the coupling in a functional relationship.

3 Claims, 6 Drawing Figures

AXIAL DISPLACEMENT COUPLING

This is a continuation of co-pending application Ser. No. 678,348, filed on Dec. 5, 1984.

TECHNICAL FIELD

This invention generally relates to connectors for effecting fluid-tight joints between two sections of a fluid conduit and more particularly this invention relates to connectors which will make a flexible joint between two sections of a fluid conduit.

BACKGROUND ART

U.S. Pat. No. 4,103,939, dated Aug. 1, 1978 and entitled "Multi Passage Flexible Connectors", discloses and claims a multi-channel flexible connector for connecting multiple parallel conduits. The input pipes are connected to a housing and the output pipes are connected to a nipple assembly that protrudes from the housing and is free to move angularly with respect thereto, the connector also being provided with a seat and an elastomeric body for accommodating the angular movements. The nipple is provided with a plurality of passages arranged in a circular fashion about the longitudinal axis of the connector. A corresponding plurality of passages is also provided in the elastomeric body, in the seat and in the housing. The inner and outer surfaces of a flared end of the nipple, as well as a plurality of spherical reinforcing rings within the elastomeric body, have their respective surfaces spherical with respect to a center of deflection located on the longitudinal axis of the housing. The elastomeric body is adhered to the opposing spherical surfaces on the nipple and the seat, and it consequently seals the respective passageways from each other and from the external environment at the interface between the nipple and the seat, while permitting the required angular movement. In order to effect a seal at the interface between the seat and the housing that will accommodate a limited longitudinal movement, the portion of the seat in the vicinity of each of the passageways is formed as an individual piston-shaped member and a corresponding cylindrical recess is provided in the housing with the required seal being maintained between each piston and its corresponding cylinder by means of a plurality of O-rings.

U.S. Pat. No. 4,076,284, dated Feb. 28, 1978, and entitled "Ocean Floor Riser Connection" discloses and claims a flexible connector suitable for use to effect a flexible connection in the riser between a deep-sea oil well and an offshore floating platform. As noted in that patent, in such an environment a connector is subject to widely varying forces and may involve subjecting the riser connector to production pressures which could be substantially higher than the hydrostatic head on the outer periphery of the connector. The particular connectors disclosed in that patent have but a single passageway surrounded by an elastomeric sealing member which is maintained under compression by a combination of hydrostatic pressures outside of the unit as well as by the high pressures of the operating fluid within the passageway and by tension forces exerted on the connection, with O-rings being used to effect a fluid-tight joint between a collar located at the upper end of the elastomeric seal relative to an internal cylindrical surface of the housing.

U.S. Pat. No. 3,680,895, dated Aug. 1, 1972 and entitled "Flexible Joint Means", discloses and claims an omnidirectionally flexible joint for fluid conduits subject to high pressures and axial loads, including one embodiment having two inner housings that are capable of separate and independent flexing movements with respect to a common outer housing, whereby a given joint deflection can be accomplished by means of simultaneous deflection of both inner housings so that the load on each respective seal assembly may be cut to half of that which would otherwise have been required with the attendant advantages of lower operating stress on each of the seal assemblies and a longer service life.

U.S. Pat. No. 3,194,589, "Vibration Isolating Pipe Coupling" discloses a coupling member for connecting pipes or tubes and also acts as a vibration isolating element between the sections of pipe being joined. Generally, the coupling member disclosed in U.S. Pat. No. 3,194,589 comprises: (1) a longitudinally-extending housing which forms a tubular conduit; (2) an annular piston-like member which is slidably received by the housing so that its tubular inner surface coacts with the housing to provide a fluid passageway; and (3) a member of axially-compliant seals located between the housing and the slidable piston member for effecting a fluid tight seal between the elements of the coupling and for permitting vibration-decoupling motion between the housing and piston member.

U.S. Pat. No. 3,734,546, "Flexible Pipe Connection" discloses a flexible pipe connection which prevents or minimizes the transmission of sounds produced in the pipeline. The connector disclosed comprises an annular housing with a central cavity and a nipple partially submerged in the cavity. The submerged portion of the nipple has a flared end which serves as the base for two annular elastomeric seals which are placed between the nipple and the housing. The first of these assemblies is located on the interior surface of the flared end and bridges the nipple and the housing to provide a constant inside diameter for the joint so that this diameter corresponds to the inside diameter of the pipes being joined and a smooth, quiet flow of fluid through the joint is assured. The second and larger sealing assembly is placed on the exterior surface of flared end of the nipple and is configured to close the central cavity of the housing and to clear the nipple and housing for flexural movement. The first and second assemblies are in the form of spherical segments and have a common center of rotation in the longitudinal axis of the joint which permits omnidirectional flexure of the joint. The use of rubber O-rings in the inner and outer rings of the first seal adjacent the housing and nipple member and between the collar of the second seal and the flared end of the nipple is also disclosed.

U.S. Pat. No. 4,198,078, "Pressurized Vibrator Isolator" discloses a sound and vibration isolator for use in automotive air conditioning conduit systems wherein vibrations are absorbed within an elastomer. Generally, a cylinder casing communicates with a tubular conduit connection portion coaxial with the cylinder. The cylinder includes an inner pressure face wall perpendicularly disposed to the cylinder axis. A piston member having an elongated tubular form with a head at one end formed by a radially disposed annular flange positioned in axially spaced opposed relationship to the cylinder pressure face wall and a conduit connection stem portion at the other end. The open end of the cylinder is closed by an annular reaction will transversely disposed to the cylinder axis and an elastomer seal and vibration damper is interposed between the piston head and the cylinder reaction wall, and is bonded thereto. Radial clearance exists between the inner dimension of the elastomer and the cylindrical stem of the piston because the elastomer is only bonded to the piston adjacent the head. This construction allows relative torsional deflection between the cylinder and the piston about the axis of the respective connection conduits. Also, limited angular deflection between the piston and cylinder relative to the isolator axis is permitted by the elastomer.

U.S. Pat. No. 3,853,337, "Flexible Elbow Joint for Pipes" discloses a flexible pipe elbow joint with dual end flexure units providing omnidirectional flexural movement and lateral movement of the pipes joined. The joint comprises a 90° elbow with dual end flexure units attached. The flexure units are identical and have bell shaped annular housings with end flanges at the bell mouth. A nipple with a flared end protrudes into the housing cavity and the nipple end is connected to the interior of the end flange by a first scale assembly and to the housing top by a second seal assembly. The first seal assembly closes the bell mouth and the second seal assembly provides for a constant diameter opening through the joint. Both seal assemblies have elastomeric elements which permit omnidirectional flexibility and also lateral movement of the nipple with respect to the housing.

U.S. Pat. No. 3,957,291, "Ball Joint Assembly with Internal Passages" discloses a multi-passage ball joint assembly for connecting a riser or similar pipe to a well pipe primarily in underwater installations. The ball member of the joint assembly has a main longitudinal bore or passage through which well operations may be conducted and at least one passage for conducting fluid. The housing of the joint assembly includes passageways which connect the bore and passages which extend through the ball in all positions of the ball relative to the housing so that fluid can be conducted downward through the ball to activate devices below the joint for other purposes.

U.S. Pat. No. 3,190,374, "Soil Drilling Apparatus Having Means to Change the Direction of the Drill" which comprises a hollow bushing formed in two pivotally connected sections and operable by the pressure of drilling fluid on a part thereof to control the inclination of the motor. The upper section of the bushing is connected to the drill string of the apparatus and is constructed to provide the axis of articulation for the lower section. The upper section also carries a piston having an extension or pushing member that is arranged on movement of the piston to cause the lower section of the bushing which is connected to a turbine to assume an inclined position with relation to the upper section. The driving force exerted by the push member on the lower section is the result of a difference of opposing pressures applied to upper and lower faces of the piston.

U.S. Pat. No. 908,414, "Flexible Ball Joint" discloses a flexible ball joint in conjunction with a ball case which has multiple passages through the ball and the neck corresponding to passages in the case and independent packings for pipes connected to the case.

However, offshore oil drilling and producing operations such as pumping stations, storage and tanker loading facilities, require the use of flexible connectors that can withstand the rigors of a hostile submarine environment in addition to withstanding the tensile and flexural stresses to which the pipes in such facilities are subjected.

DISCLOSURE OF THE INVENTION

Accordingly, it is an object of the present invention to provide an improved flexible connector for effecting fluid-tight joints which can accommodate axial and angular displacement between fluid conduits joined thereby.

It is another object of the present invention to provide a compact, flexible connector for effecting fluid-tight joints between fluid conduits joined thereby which can accommodate tensile and torsional motion between the fluid conduits and which is a self-contained unit.

It is still another object of the present invention to provide a compact, flexible connector for effecting fluid-tight joints between fluid conduits joined thereby and which can accommodate tensile and torsional motion between the conduits by causing each of a pair of flexural units to move in the opposite direction.

A principal feature of the present invention is the provision of a unique flexible connector for forming fluid-tight joints which can accommodate axial and angular displacement between fluid conduits joined thereby. In accordance with the present invention, a connector is provided for fluid conduits (pipes) which includes a housing which defines a central bore and connecting conduits having flanges which extend from the housing and provide a fluid-tight junction between pipes being joined by the connector. The flanges are held in a fluid-tight relationship with the housing by a compression ring which is positioned between the interior wall of the housing and a portion of the flange of the connecting conduit which extends into the housing. This construction allows the flanges to undergo angular deflection with respect to the longitudinal axis of the central bore when an angular force is applied to the flanges. Additionally, an inner collar is positioned between the inner surface of the housing and the rear of each flange which will compress and allow the flanges of the connecting conduit to move axially with respect to the long axis of the housing when a tensile force is applied to the flanges.

Another feature of the present invention is the replacement of sliding seals in the connecting device with shear seals which substantially reduces seal deterioration due to friction.

In addition to the feature of using shear seals to replace sliding seals, the invention is further characterized by the simplicity and ease of its operation and the capability of each connecting conduit to move in a direction opposite the direction moved by the other, thereby eliminating the need to use a chain of angularly displaceable members all moving in the same direction in order to accommodate angular deflection of the pipes being joined.

One advantage of the present invention is its ability to operate in a harsh environment for extended periods of time without requiring maintenance.

Another advantage of the present invention is its compact design and the elimination of the need for chaining a series of flexible elements together to accommodate angular displacement of the pipes being joined from the long axis of the coupling device.

Still another advantage of the present invention is the ability of the connector to withstand high internal and external pressures.

Another important advantage of the present invention is the ability of the connector to accept three misalignment conditions concurrently.

Another important advantage of the present invention is the predictability of the forces required to cause misalignment because of the absence of sliding (friction) seals.

In accordance with these and other objects, features and advantages of the present invention, there is provided an improved flexible connector for effecting fluid-tight flexible joints between fluid conduits comprising a housing which defines a central bore; a pair of connecting conduits having flanges, each connecting conduit projecting from either end of the housing which are capable of forming a fluid-tight joint between a pair of pipes; a first pair shear seal collars, positioned between the interior wall of the housing and a portion of the flanges which extends into the central bore; a second pair of shear collars positioned between the first shear collars and said flanges; a pair of inner lock rings attached to said second shear collars and in contact with the inner walls of said flange so that when said lock rings are tightened against the second shear collars the flanges are compressed therebetween; and an outer lock ring adapted to attach to both ends of the housing so that said first and second shear collars are retained within the housing and in contact with the flanges and the flanges may move both axially and angularly with respect to the long axis of the housing.

In accordance with the present invention the first shear collars further comprise means for effecting a fluid-tight seal between the first shear collars and the second shear collars.

In accordance with the present invention, the first shear collar further comprises means for effecting a fluid-tight seal between the first shear collars and the inner walls of the housing.

In accordance with the present invention the flanges further comprise means for effecting a fluid-tight seal between the flanges and the outer lock rings.

In accordance with the present invention the first shear collar comprises an annular metal-elastomer laminate which has a slightly conical cross-section when not compressed.

In accordance with the present invention the metal reinforcing elements of the first shear collar are offset from parallel with the center line of the collar.

In accordance with the present invention the first shear collar when properly positioned in the flexible connector is compressed so that the metal-elastomer laminate is displaced from its molded configuration to minimize the stresses on the coupling.

Additionally, in accordance with the present invention the flexible coupling and the pipes connected thereby may be extended, deflected, retracted and/or misaligned without interference with the flow of fluid therethrough.

Further, in accordance with the present invention, the flexible coupling may be configured as retracted—misaligned, retracted deflected, extended misaligned or extended deflected, depending upon the forces acting upon the pipes connected thereby.

In accordance with the present invention the first shear collar comprises a main body, and a pair of legs extending therefrom at an angle and which about the inner surface of the housing, an inner retaining ring and an outer retaining ring.

These and other objects, features and advantages of the present invention will become more readily apparent with a reading of the following more particular description of the preferred embodiment in conjunction with the accompanying drawings. The drawings in which like reference characters indicate corresponding parts in all views, are not necessarily to scale, emphasis instead being placed on illustrating the principles of the invention.

BEST MODE OF CARRYING OUT THE INVENTION

Figure 1:
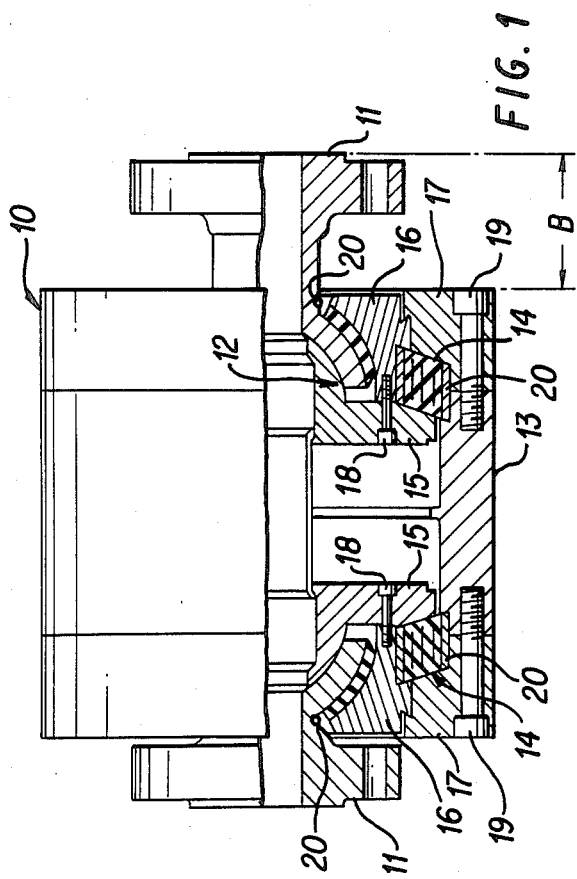
FIG. 1 is a partial cross-section of the present invention in which the coupling is shown in the extended configuration.
Figure 6:
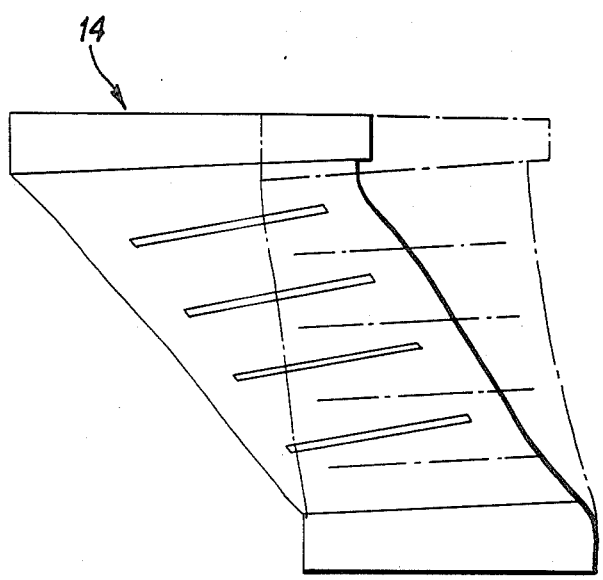
FIG. 6 is a partial cross-section of the shear collar shown in FIG. 5 taken along section line 6—6 and which compares its as molded configuration to its installed-displaced configuration.

Referring to FIG. 1, the coupling which comprises the present invention, generally indicated by numeral 10 illustrates the coupling in the extended configuration. In its simplest form the coupling 10 comprises a pair of connecting conduits 9 each having first and second ends, the first end of each conduit 9 having curved flanges 11 which extend into the central bore 12 of housing 13 and the second end of each conduit 9 being are adapted to couple with and join riser pipes or other fluid conduits (not shown) so that motion of the pipes being joined can be accommodated. Flanges 11 are held in bore 12 by a combination of shear collars 14 and lock collars. Second shear collars, adapted to accommodate axial movement by flanges 11, do not contact flanges 11 but instead are mounted between the inner surfaces of bore 12, inner lock rings 15, first shear collars 16 and outer lock rings 17. Inner lock ring 15 is attached to first shear collar 16 by means of studs 18 which are evenly spaced about the circumference of inner lock ring 15. The first shear collars 15 and inner lock rings 15 assemblies are in turn held in proper position with respect to flanges 11 by outer studs which are evenly spaced about the circumference of outer lock rings 17 and which connect outer lock rings 17 to housing 13. Second shear collars 14 comprise a central metallic ring 50 which is bonded to a main body 51 consisting of a reinforced elastomeric material which is in turn bonded to an outer metallic ring 52. Both inner ring 50 and outer ring 52 are grooved, 53 and 54, to accept and hold pairs of elastomeric "O" rings which form fluid-tight seals with the first shear collar-inner lock ring assembly and the inner surface of central bore 12. In one embodiment of the present invention the main body 51 comprises an elastomer-metal laminate in which metal reinforcing elements are bonded to the elastomeric material in an orientation which is substantially parallel to the long axis of the coupling. In another embodiment of the present invention, the main body 51 comprises an elastomer-metal laminate in which metal reinforcing elements are bonded to the elastomer in an orientation which is offset slightly from parallel to the long axis of the coupling. When the offset elastomer-metal laminate is used it has been found that metal reinforcing elements offset about 4° from parallel to the long axis of the coupling provide optimum shear characteristics. When second shear collars are dislocated from their as molded configuration in which the main body 51 projects outward from the inner ring 50 to a configuration in which it is compressed to substantially eliminate the outward projection from inner ring 50 to outer ring 52. FIG. 6 depicts the shift which occurs when second collar is installed. This preloaded configuration provides for movement of flanges 11 in both directions along the long axis of the coupling so that when the coupling is extended as in FIG. 1 it will recover to the retracted positions shown in FIG. 3 when the outside force being applied to it is removed. Turning specifically to FIG. 6 which shows a sectional view of the second shear collar 14 taken along section line 6—6, the dotted lines indicate the installed position of collar 14 and the solid lines represent the as molded position of collar 14.

Figure 2:
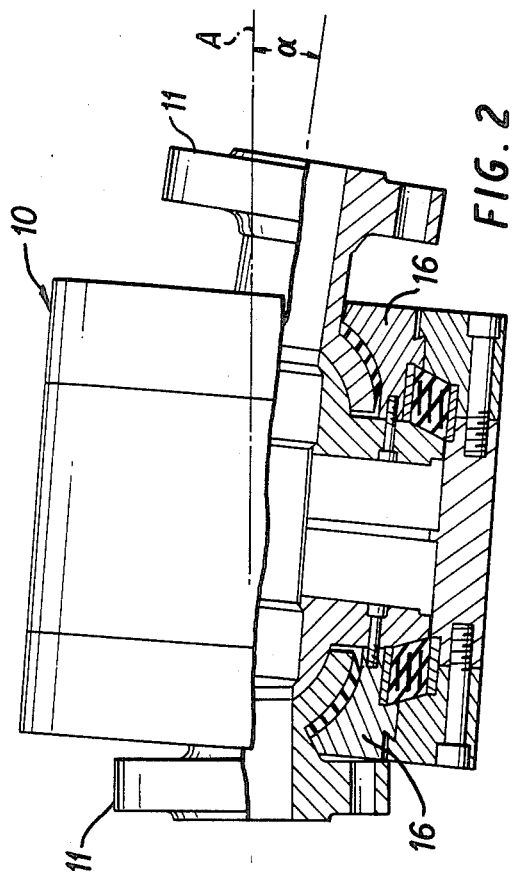
FIG. 2 is a partial cross-section of the present invention in which the coupling is shown in the deflected configuration.

FIG. 2 represents the coupling 10 in a deflected position. Flanges 11 may be offset from axis A of the coupling by an angle α when an external force is applied to the flange. Angle α is the maximum deflection which can be accommodated along either the X, Y or Z axes when an external force is applied to the flanges 11 of coupling 10. The amount of deflection that can be accommodated by coupling 10 is determined by first shear collars 16 which like second shear collar 14 consists of metal reinforced elastomer laminate which functions both to provide a fluid-tight seal to prevent the loss of fluid being conveyed through coupling 10 and to prevent the contamination of the conveyed fluid by sea water or other fluids which might make up the external environment of coupling 10. While different in shape from second collar 14, first collar consists of alternating laminations of elastomer 55 and metal reinforcing elements 56 which are molded together and bonded to a supporting structure of appropriate shape. Both first collar 16 and second collar 14 function as shear seals and elastomeric springs which accommodate motion of specific portions of the coupling 10 in specific directions and cause the moving portions (flanges 11) to return to their original positions when the external force causing the movement is removed. Specifically, first collar 16 regulates and facilitates angular motion from axis A up to and through the maximum accommodated angle of deflection α. Second collar 14 regulates and facilitates axial or longitudinal movement of flanges up to the maximum accommated linear distance B along coupling axis A. It should be understood that because both flanges are capable of axial motion the maximum extension of coupling 10 would be 2B and the maximum angular deflection actually possible would be 2α if both flanges 11 moved in the appropriate direction to cause such extension and/or angular deflection.

Figure 4:
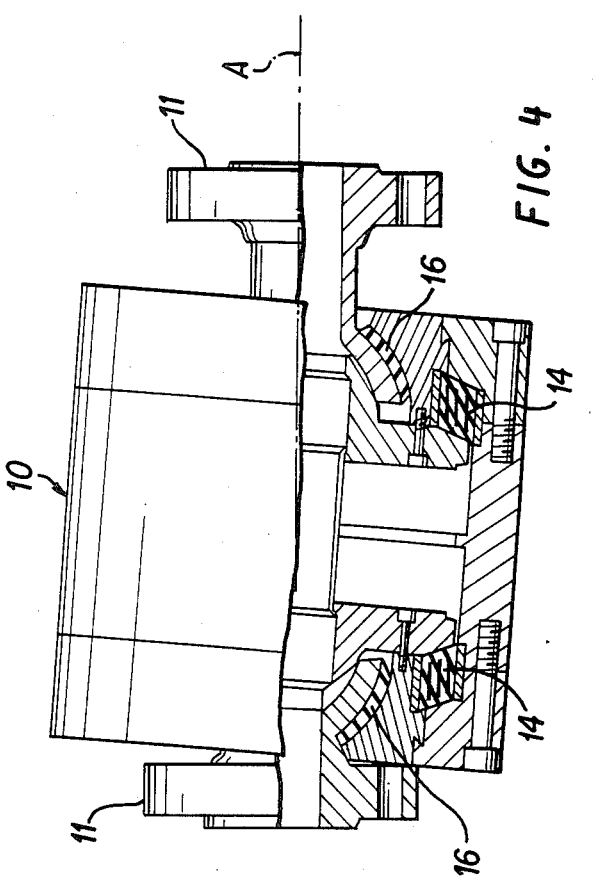
FIG. 4 is a partial cross-section of the present invention showing the coupling in its misaligned configuration.
Figure 3:
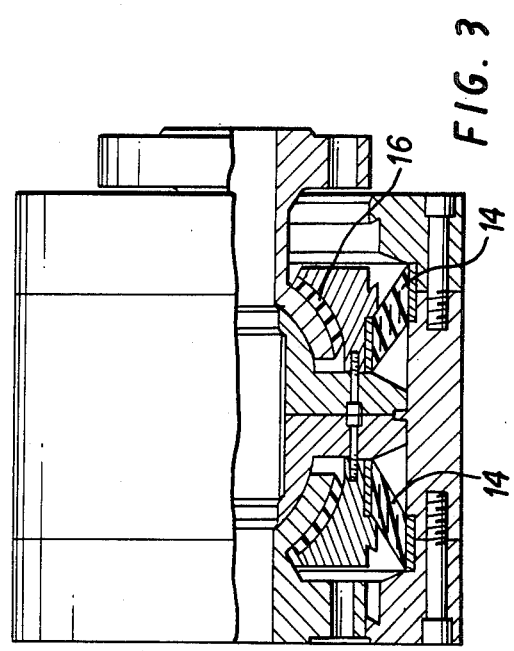
FIG. 3 is a partial cross-section of the present invention showing the coupling in its retracted configuration.
Figure 5:
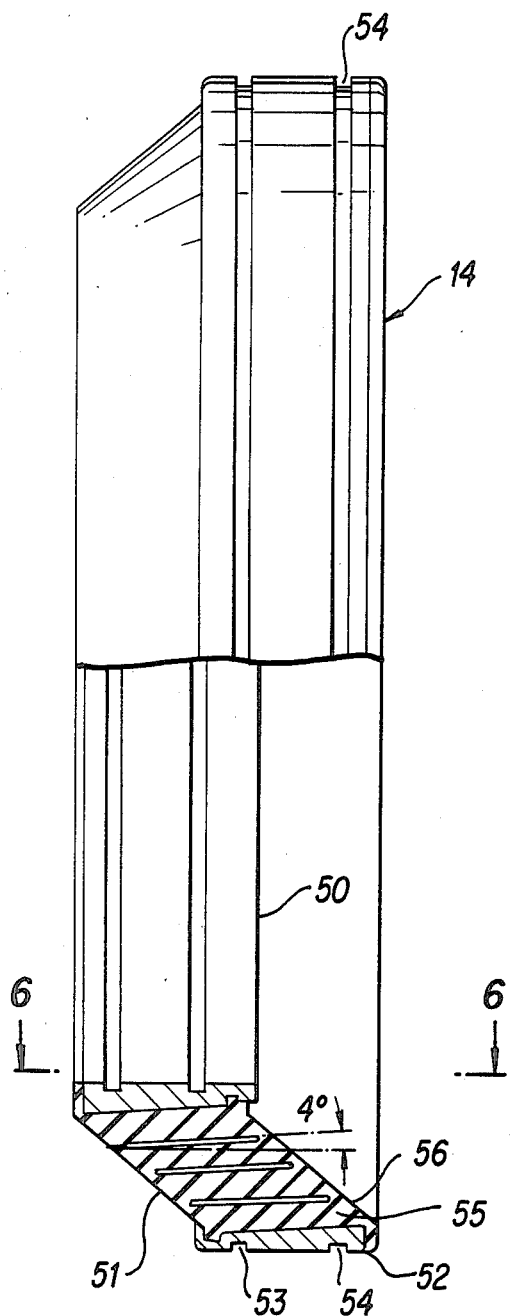
FIG. 5 is a partial cross-section of a shear collar of a type used by the present coupling to allow axial movement within the coupling housing.

FIG. 3 shows coupling 10 in the fully retracted position with no angular deflection and no axial extension. FIG. 4 shows the coupling 10 in a misaligned position wherein flanges 11 are radially misaligned. Here, again, collars 14 and 16 control misalignment and recover to the at rest or retracted position when external forces causing misalignment are removed.

One important improvement which has resulted from the use of shear seals such as collars 14 and 16 is that the coupling 10 is substantially maintenance-free because wear of moving parts has been substantially eliminated by the use of shear seals (collars 14 and 16 in combination with "O" rings 20) to replace the friction seals used by prior art couplings.

Although the present invention has been discussed and described with primary emphasis on one embodiment, it should be obvious that adaptations and modifications can be made without departing from the spirit and scope of the invention.

We claim:

1. A flexible connector for effecting fluid-tight flexible joints between fluid conduits comprising:
   (a) a housing having ends and defining a central bore having a longitudinal axis;
   (b) a pair of connecting conduits, each connecting conduit having curved flanges, which having first and second ends, said first end of each connecting conduit having curved flanges, which extend into said central bore from opposing ends of said housing, respectively, said second end of each connecting conduit for effecting a fluid-tight junction between the housing and external fluid conduits;
   (c) a first compression ring positioned adjacent said curved flanges of said first end of each connecting conduit which extends into said central bore, said first compression ring being elastically compressible when an angular force is applied to said flanges to permit angular deflection of said flanges with respect to the longitudinal axis of said central bore;
   (d) a second compression ring positioned between said first compression ring of each connecting conduit and the inner wall of said housing so that said flanges and said associated first compression ring can move axially with respect to the longitudinal axis of said central bore of said housing when a force is applied to said flanges along the longitudinal axis of said central bore, said second compression ring being a reinforced elastomeric collar, said collar being reinforced with metal elements bonded to said elastomer to form a laminate so that the elastomeric collar can compress and expand in response to the application of a force to said connector along the longitudinal axis of said housing;
   (e) an inner lock ring attached to said first compression ring of each connecting conduit and in contact with the interior wall of said associated flange so that when said inner lock ring is tightened against said first compression ring, said associated flange is compressed therebetween;
   (f) an outer lock ring for attachment to each of said ends of said housing having a connecting conduit extending therethrough so that said first and second compression rings of each connection conduit are retained within said housing and said first compression ring is in contact with said associated flange of said connecting conduit to permit both axial and angular movement of each of said connecting conduits with respect to the longitudinal axis of said housing;
   (g) means for limiting the distance which said flange of each connecting conduit may move along the longitudinal axis of said housing when a force is applied to said connector along the longitudinal axis of said housing; and
   (h) means for holding said housing, said flanges of each connecting conduit, said first compression ring, said second compression ring, said inner lock ring and said outer lock ring in functional relationship.

2. The flexible connector of claim 1 wherein the elastomer and metal reinforcing elements of said laminate are oriented parallel to the longitudinal axis of said housing and take the form of a multiplicity of spaced and overlapping tubular elements bonded together to form said collar.

3. The flexible connector of claim 1 wherein the elastomer and metal reinforcing elements of said collar are oriented conically with respect to the longitudinal axis of said housing by tapering each reinforcing element up to about four degrees off the longitudinal axis of said housing.

* * * * *